H. SCHMIDT.
METALLIC CONNECTION FOR CYCLE FRAMES.
APPLICATION FILED JAN. 30, 1912.
1,117,916. Patented Nov. 17, 1914.
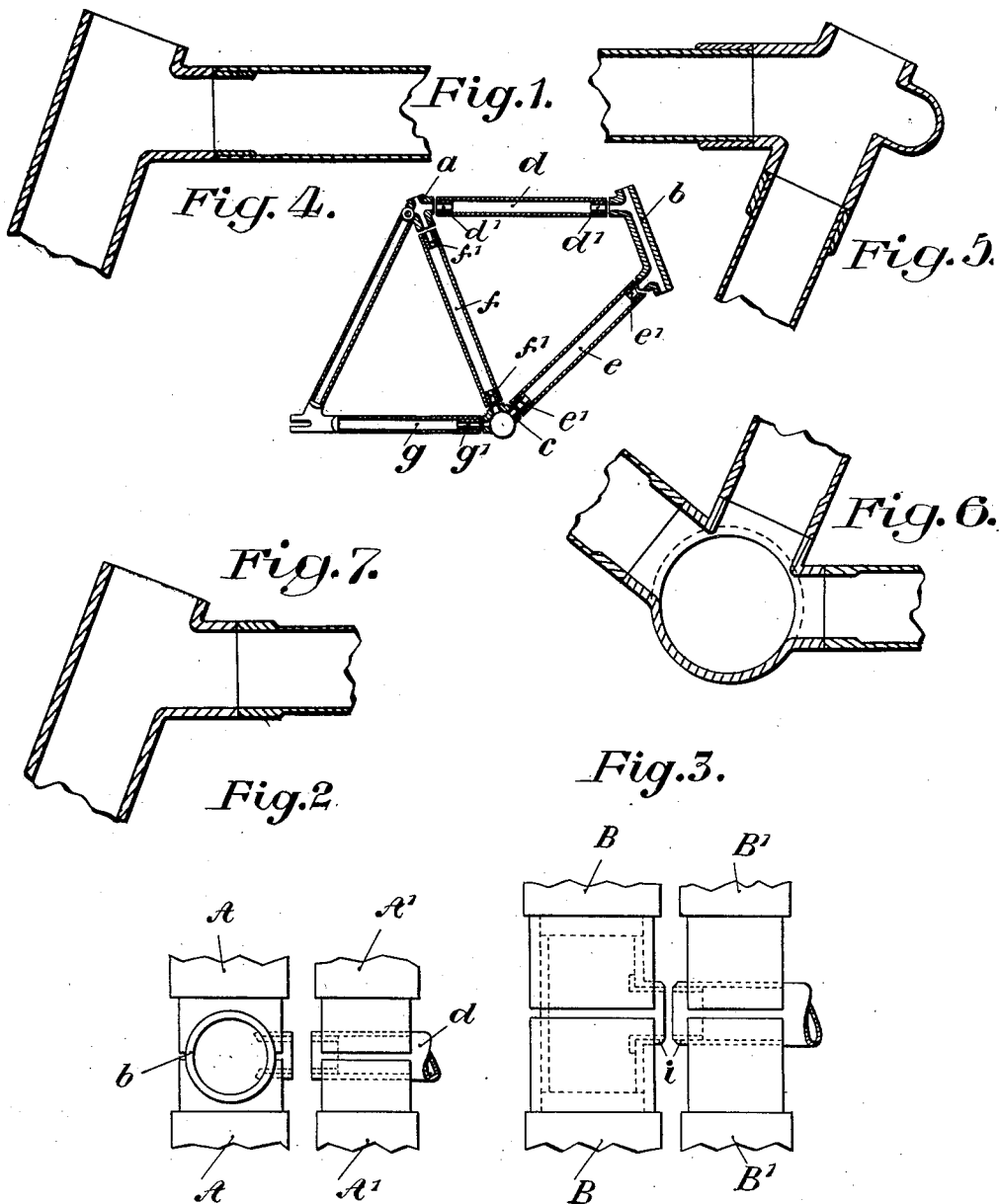
Witnesses:
Inventor
Hermann Schmidt

UNITED STATES PATENT OFFICE.

HERMANN SCHMIDT, OF SUHL, GERMANY.

METALLIC CONNECTION FOR CYCLE-FRAMES.

1,117,916.  Specification of Letters Patent.  Patented Nov. 17, 1914.

Application filed January 30, 1912. Serial No. 674,275.

*To all whom it may concern:*

Be it known that I, HERMANN SCHMIDT, a subject of the German Emperor, residing at Suhl, Kingdom of Prussia, Germany, have invented certain new and useful Improvements in Metallic Connections for Cycle-Frames, of which the following is a specification.

This invention relates to the manufacture of durable metallic connections of relatively thin tubes with relatively heavy angle pieces, crank shaft casing, forked ends, etc., as in bicycle frames. The connection is effected by electric resistance welding of the faces of the parts in question with simultaneous compression at the welding zone.

According to the present invention, the thin walled frame tubes are strengthened at the welding zone by the provision of tubular parts which are so combined with the tube ends to be welded as to give to said tube ends an aggregate thickness equal to the thickness of the socket parts to which the tubes are to be joined. The socket parts of the bicycle frame which are to be connected by electric resistance welding to the tubes are preferably smooth at the points to be welded. The strengthening of the relatively thin pipes or tubes to be welded is effected by the use of tubular elements which fit closely upon (Figs. 5 and 7) or within (Figs. 4 and 6) the tube ends and make the latter approximately fit or conform to the thick-walled sockets. The said tubular strengthening elements may be originally structurally independent of the tube (Figs. 4 and 5) or they may be originally an integral part of the tube end (Figs. 6 and 7) and formed by some operation suitable for the purpose in view to provide enlargements of said tube end, similar in purpose and relation to the enlargements provided by tubular strengthening elements which are originally structurally independent of the tube. Preferably, the tubular strengthening elements have a sleeved, (*i. e.*, surrounding), relation Figs. 5 and 7 with the tube ends with which they are combined.

The metallic connection of bicycle frames, hitherto used, has been effected by brass soldering or by autogenous welding. Both methods are very expensive owing to the length of the process and the accessories and subsequent working required. On the contrary, the metallic connection of bicycle parts according to this invention, considerably reduces the cost of manufacture of a bicycle frame, owing to the quickness of manufacture of the connection and owing to the small amount of subsequent work which it requires.

A construction of a bicycle frame with various prepared welding points is shown in section in Figure 1 of the accompanying drawing by way of example. Figs. 2 and 3 show in elevation two fixing or clamping and current supply devices. Fig. 4 is a detail sectional view showing the tubular strengthening element as originally structurally independent of the tube and with which it is associated and arranged within the same. Fig. 5 is a similar view but showing an external arrangement of the tubular strengthening element. Figs. 6 and 7 are similar views showing respectively internal and external arrangements of the tubular strengthening element but wherein the said element is originally integral with the tube end with which it is associated.

The socket parts $a$, $b$, $c$ of the bicycle frame which are to be connected by electric welding to the tubes $d$, $e$, $f$, $g$, are preferably smoothed at the points to be welded. In order to insure a specially durable welding, thin walled pipes or tubes are strengthened at their ends by inserting or covering them with sleeves $d^1$, $e^1$, $f^1$, $g^1$, in order that the ends of the tubes $d$, $e$, $f$, $g$ to be welded should approximately fit the thick walled socket $a$, $b$, $c$. Any differences can be equalized by suitable distances of the current supply jaws from the welding point. In the same way angle parts and the like with thin walls, are preferably strengthened at the point.

The parts suitably prepared, are connected by welding jaws or clamps, mandrels, sockets, etc., to the poles of a welding machine. When the jaws A, A¹ or B, B¹ are brought together by means of guides, so that the parts to be welded are in contact and close the circuit, a current of great intensity strongly heats them in a few seconds at the welding point which is exceedingly strongly compressed when the current is switched out, so that a slight bur is produced both inside and outside. The said bur can be easily and quickly removed by chisels adapted to fit the cross-section, for instance by chisels driven by compressed air, so that there is very little subsequent treatment required. The formation of bur can also be almost completely avoided by giving the surfaces to be welded together (for instance by breaking the edges $i$)—Fig. 3—such a shape that the outer circumference is filled out only when the pressure is completed. In the same way, a corresponding casing or envelope of the welding point prevents any formation of bur.

In supplying current by means of clamping jaws, it must be remembered that in the case of straight or round faces of the welding points, the jaws must have a corresponding shape, so as to avoid as far as possible an irregular heating of the welding point. The tube, etc., to be welded, must lie free at least so far as to enable a welding zone to be formed, and so that the heating should not be destroyed or interfered with by the close proximity of the clamping jaws.

What I claim is:

1. An electrically welded joint between relatively thin tubes and relatively heavy angle pieces and the like, as in the manufacture of bicycle frames, including a tubular strengthening element combined with and closely fitting the tube end to strengthen said tube end and to make the latter of an aggregate thickness and diameter approximately equal to the thickness and diameter of the relatively heavy part and in which the end faces of the tubular element and the tube are conjointly welded to the adjoining end face of the relatively heavy part.

2. An electrically welded joint between relatively thin tubes and relatively heavy angle pieces and the like, as in the manufacture of bicycle frames, including a tubular strengthening element combined with and closely fitting the tube end and in which the end faces of the tubular element and the tube are conjointly welded to the adjoining end face of the relatively heavy part.

3. An electrically welded joint between relatively thin tubes and relatively heavy angle pieces and the like, as in the manufacture of bicycle frames, including a tubular strengthening element surrounding and closely fitting the tube end and in which the end faces of the tubular element and the tube are conjointly welded to the adjoining end face of the relatively heavy part.

4. An electrically welded joint between relatively thin tubes and relatively heavy angle pieces and the like, as in the manufacture of bicycle frames, including a tubular strengthening element surrounding and closely fitting the tube end to strengthen said tube end and to make the latter of an aggregate thickness and diameter approximately equal to the thickness and diameter of the relatively heavy part, and in which the end faces of the tubular element and the tube are conjointly welded to the adjoining end face of the relatively heavy part.

5. An electrically welded joint between relatively thin tubes and relatively heavy angle pieces and the like, as in the manufacture of bicycle frames, including a tubular strengthening element combined with a closely fitting tube end and in which the end faces of the tubular element and the tube are conjointly welded to the adjoining end face of the relatively heavy part, the said tubular strengthening element being formed as an integral part of the tube end with which it is associated.

In testimony whereof I have hereunto set my hand in presence of two subscribing witnesses.

HERMANN SCHMIDT.

Witnesses:
ERNST EBERHARDT,
ALFRED HOFFMANN.